(12) United States Patent
Cole et al.

(10) Patent No.: US 11,853,006 B2
(45) Date of Patent: Dec. 26, 2023

(54) LIGHT ENGINE

(71) Applicant: ENVISICS LTD, Milton Keynes (GB)

(72) Inventors: Alexander Cole, Milton Keynes (GB); Timothy Smeeton, Milton Keynes (GB); Jamieson Christmas, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 0 days.

(21) Appl. No.: 18/072,275

(22) Filed: Nov. 30, 2022

(65) Prior Publication Data
US 2023/0280693 A1 Sep. 7, 2023

(30) Foreign Application Priority Data

Mar. 4, 2022 (GB) ...................................... 2203038

(51) Int. Cl.
*G03H 1/22* (2006.01)
*G02B 27/00* (2006.01)
*G02B 27/01* (2006.01)

(52) U.S. Cl.
CPC ....... *G03H 1/2294* (2013.01); *G02B 27/0081* (2013.01); *G02B 2027/0121* (2013.01); *G03H 2001/2239* (2013.01)

(58) Field of Classification Search
None
See application file for complete search history.

(56) References Cited

U.S. PATENT DOCUMENTS

| 11,567,317 | B2 | 1/2023 | Christmas | |
|---|---|---|---|---|
| 2016/0147003 | A1 | 5/2016 | Morozov et al. | |
| 2019/0227321 | A1* | 7/2019 | Lee | G02B 27/0101 |
| 2019/0391393 | A1 | 12/2019 | Ayres et al. | |
| 2020/0110361 | A1* | 4/2020 | Georgiou | G03H 1/0248 |
| 2023/0088953 | A1* | 3/2023 | Smeeton | G02B 27/0081 359/13 |
| 2023/0090648 | A1* | 3/2023 | Christmas | G02B 27/0101 359/630 |

FOREIGN PATENT DOCUMENTS

| GB | 2518315 A | 3/2015 |
|---|---|---|
| GB | 2603517 A | 8/2022 |
| GB | 2603518 A | 8/2022 |

\* cited by examiner

*Primary Examiner* — Derek S. Chapel
(74) *Attorney, Agent, or Firm* — McDonnell Boehnen Hulbert & Berghoff LLP

(57) ABSTRACT

A light engine arranged to form an image visible from a viewing window. The light engine comprises: a display device arranged to display a hologram of the image and spatially modulate light in accordance with the hologram; a hologram replicator arranged to receive the spatially modulated light and provide a plurality of different light propagation paths for the spatially modulated light from the display device to the viewing window; and a control device disposed in an optical path between the first replicator and the second replicator. The control device is angled such that light from the first replicator is incident at an acute angle on the control device, and each cell of the array is switchable between a first state and a second state.

11 Claims, 10 Drawing Sheets

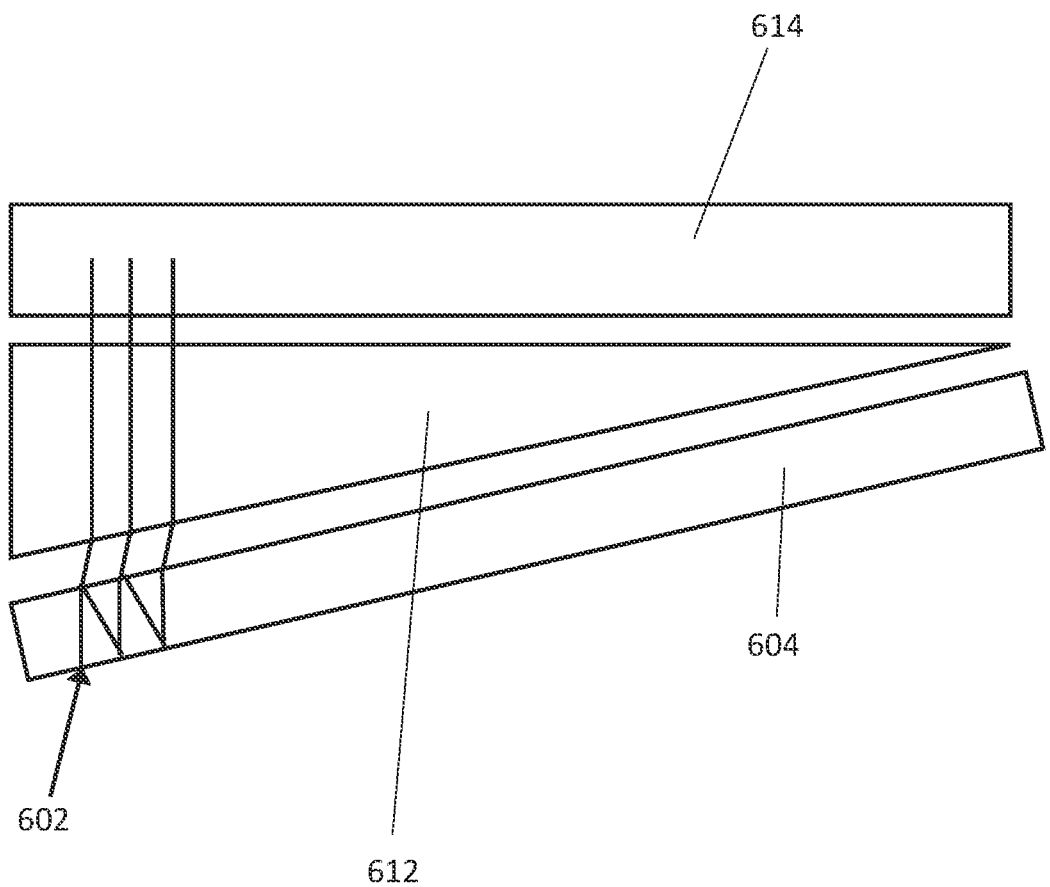
FIGURE 6A – PLAN VIEW

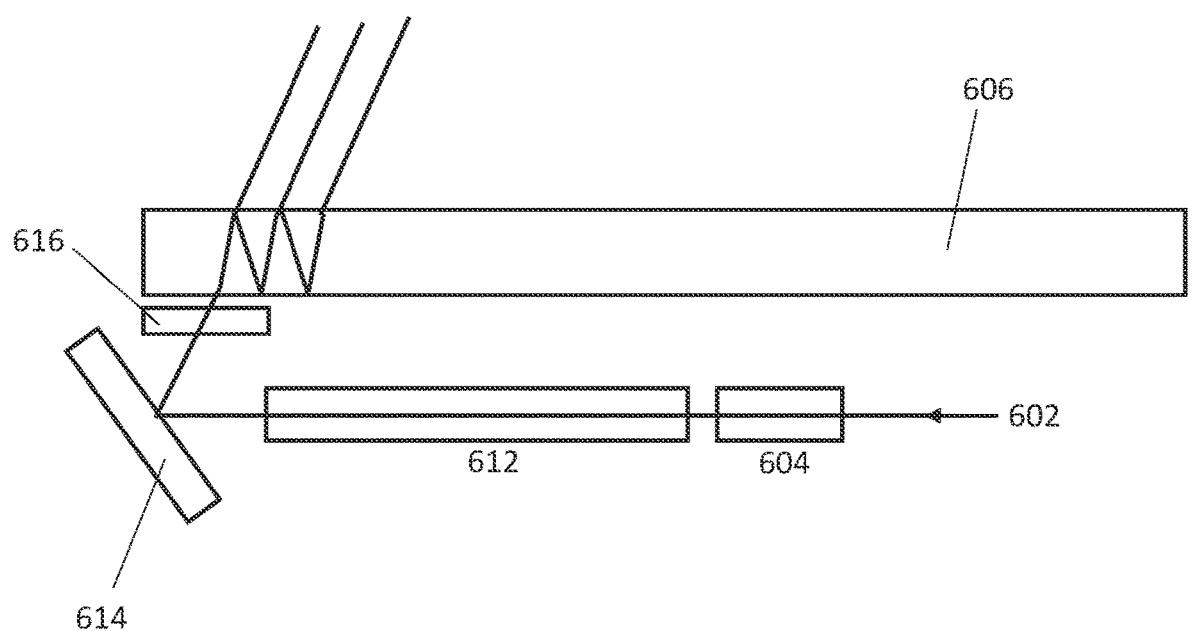
FIGURE 6B – SIDE VIEW

LIGHT ENGINE

CROSS REFERENCE TO RELATED APPLICATIONS

The present application claims priority to United Kingdom Patent Application No. GB2203038.1 filed Mar. 4, 2022 which is herewith incorporated by reference into the present application.

FIELD

The present disclosure relates to pupil expansion or replication, in particular, for a diffracted light field comprising diverging ray bundles. More specifically, the present disclosure relates a display system comprising a waveguide pupil replicator. Some embodiments relate to two-dimensional pupil expansion, using first and second waveguide pupil expanders. Some embodiments relate to picture generating unit and a head-up display, for example an automotive head-up display (HUD).

BACKGROUND

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other embodiments, the image is a real image formed by holographic reconstruction and the image is projected or relayed to the viewing plane. The image is formed by illuminating a diffractive pattern (e.g., hologram) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some examples, an image (formed from the displayed hologram) is propagated to the eyes. For example, spatially modulated light of an intermediate holographic reconstruction/image formed either in free space or on a screen or other light receiving surface between the display device and the viewer, may be propagated to the viewer.

In some other examples, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 meter viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-motion box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 meter. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels). Embodiments of the present disclosure relate to a configuration in which a hologram of an image is propagated to the human eye rather than the image itself. In other words, the light received by the viewer is modulated according to a hologram of the image. However, other embodiments of the present disclosure may relate to configurations in which the image is propagated to the human eye rather than the hologram—for example, by so called indirect view, in which light of a holographic reconstruction or "replay image" formed on a screen (or even in free space) is propagated to the human eye. The pupil expander may be alternatively referred to as a pupil replicator or merely a replicator.

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure relates to non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window—e.g., eye-box or eye motion box for viewing by the viewer.

Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The hologram may be represented, such as displayed, on a display device such as a spatial light modulator. When displayed on an appropriate display device, the hologram may spatially modulate light transformable by a viewing system into the image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram is described herein as routing light into a plurality of hologram channels merely to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be arbitrarily divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels. However, in some arrangements, a plurality of spatially separated hologram channels is formed by intentionally leaving areas of the target image, from which the hologram is calculated, blank or empty (i.e., no image content is present).

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

Broadly, a light engine is disclosed herein that is arranged to form an image visible from a viewing window.

The light engine comprises a display device arranged to display a hologram of the image and spatially modulate light in accordance with the hologram. The hologram is configured to angularly distribute spatially modulated light of the image in accordance with position of image content, such that angular channels of the spatially modulated light correspond with respective continuous regions of the image.

The light engine also comprises a hologram replicator arranged to receive the spatially modulated light and provide a plurality of different light propagation paths for the spatially modulated light from the display device to the viewing window. The hologram replicator comprises a first replicator and a second replicator. The first replicator is configured to replicate the light in a first dimension, and the second replicator is configured to replicate light in a second dimension, orthogonal to the first dimension.

The light engine also comprises a control device disposed in an optical path between the first replicator and the second replicator. The control device comprises an array of cells arranged such that a first viewing position within the viewing window receives a first channel of light spatially modulated by the hologram in accordance with a first region of the image and a second viewing position within the viewing window receives a second channel of light spatially modulated by the hologram in accordance with a second region of the image. The control device may alternatively be referred to as a switching device.

The control device is angled such that it is at an acute angle relative to the second replicator. The control device and/or second replicator may be generally planar. In some embodiments, the control device is non-parallel to the second replicator. In other words, the control device is tilted relative to the second replicator. More specifically, a general plane of the control device is non-parallel to a general plane of the second replicator. In some embodiments, an output surface of the control device is non-parallel to an input face of the second replicator. In some embodiments, the normal to the (output face of the) control device is non-parallel to the normal to the (input face of the) second replicator. Each cell of the array is switchable between a first state and a second state. In each cell, in the first state, light is relayed to be coupled into the second replicator. In each cell, in the second state, light remains uncoupled into the second replicator.

Angling the control device at an acute angle relative to the second replicator leads to light that is not coupled into the second replicator from the control device (i.e. stray light) is incident on the control device such that if it is reflected by the control device, it is sent on an optical path that is non-parallel to the light that is coupled into the second replicator. This reduces stray light being coupled into the second replicator, and therefore reduces the presence of ghost images and other artefacts.

The acute angle may be defined relative to an optical surface of the second replicator. The acute angle may also be defined relative to an axis of the second replicator. The axis may be one of the two directions of pupil expansion/hologram replication of the first and second replicator. The acute angle may be chosen such that reflections from the second replicator incident on the control device (i.e. stray light rays) are transmitted in a path that is non-parallel to the directly transmitted light such that the stray light rays remain uncoupled into the second replicator.

In some embodiments the optical surface of the control device facing the input region of the second replicator is non-parallel to the input region of the second replicator. In some embodiments, the light from the first replicator is also incident on the control device at an acute angle.

In some embodiments, the control device is a reflective device, such that in the first state light is reflected towards the second replicator. The use of a reflective device may allow for the replacement of the fold mirror in the optical system, reducing the complexity of the fabrication and therefore reducing the complexity of the manufacture of the system.

In some embodiments, the reflective device comprises a microelectromechanical system (MEMS) device.

In some embodiments, each cell comprises a mirror that pivots such that in the first state light is reflected towards the second replicator and coupled into the second replicator and in the second state light is reflected such that it remains uncoupled in the second replicator. This may allow light to be directed towards a light dump. This may also allow uncoupled light to be coupled towards a sensor for integrity monitoring.

In some embodiments, the control device comprises a liquid crystal device such that each cell in first state is substantially reflective or transmissive, and each cell in the second state is substantially absorptive.

In some embodiments, the control device receives light directly from the first replicator. This may allow the control device to act as a turning mirror, removing the requirement for a turning mirror. This reduces the complexity and mass of the system, producing a more compact system. This may be particularly advantageous in systems where space is limited, such as systems used in a vehicle.

In some embodiments, in each cell, in the second state, light is relayed towards a sensor for monitoring integrity of light engine. This may allow for the display integrity to be monitored without the use of a sensor in the view path of the user. An appropriate action may be taken based on the output of the sensor.

In some embodiments, the array of cells is a 1D array.

In some embodiments, the switching is based on output of an eye tracker. This may allow for the switching to be optimised based on where the user is looking, which may make the system more efficient.

In some embodiments, the light engine may form part of a wearable display. A wearable display may be any sort of display that may be worn or carried by a user. For example, a wearable display may be a head mounted display such as a display in glasses or a helmet.

The light engine can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

There is also disclosed herein a light engine arranged to form an image visible from a viewing window. The light engine comprises a display device, a hologram replicator and a control device. The display device is arranged to display a hologram of the image and spatially modulate light in accordance with the hologram, wherein the hologram is configured to angularly distribute spatially modulated light of the image in accordance with position of image content, such that angular channels of the spatially modulated light correspond with respective continuous regions of the image. The hologram replicator (e.g. waveguide pupil expander) is arranged to receive the spatially modulated light and provide a plurality of different light propagation paths for the spatially modulated light from the display device to the viewing window. The control device is disposed between the waveguide and the viewing window, wherein the control device comprises at least one aperture arranged such that a first viewing position within the viewing window receives a first channel of light spatially modulated by the hologram in accordance with a first region of the image and a second viewing position within the viewing window receives a second channel of light spatially modulated by the hologram in accordance with a second region of the image. The control device is reflective (e.g. control device is a liquid crystal on silicon device) and (a plane thereof is) angled with respect to a plane of the replicator (such that light reflections off the (input face of the) hologram replicator do not reach the viewing window).

In accordance with the present disclosure, pupil expansion is provided for diffracted or diffractive light, which may comprise diverging ray bundles. The diffractive or diffracted light may be output by a display device such as a pixelated display device such as a spatial light modulator (SLM) arranged to display a diffractive structure such as a hologram. The diffracted light field may be defined by a "light cone". Thus, the size of the diffracted light field (as defined on a two-dimensional plane) increases with propagation distance from the corresponding diffractive structure (i.e. display device).

The spatial light modulator may be arranged to display a hologram. The diffracted or diverging light may comprise light encoded with/by the hologram, as opposed to being light of an image or of a holographic reconstruction. In such embodiments, it can therefore be said that the pupil expander replicates the hologram or forms at least one replica of the hologram, to convey that the light delivered to the viewer is spatially modulated in accordance with a hologram of an image, not the image itself. That is, a diffracted light field is propagated to the viewer.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

In the present disclosure, the term "substantially" when applied to a structural units of an apparatus may be interpreted as the technical feature of the structural units being produced within the technical tolerance of the method used to manufacture it.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE FIGURES

Specific embodiments are described by way of example only with reference to the following figures:

FIG. 6A shows a system comprising an optical wedge;

FIG. 6B shows the system in side view;

The same reference numbers will be used throughout the drawings to refer to the same or like parts.

DETAILED DESCRIPTION

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
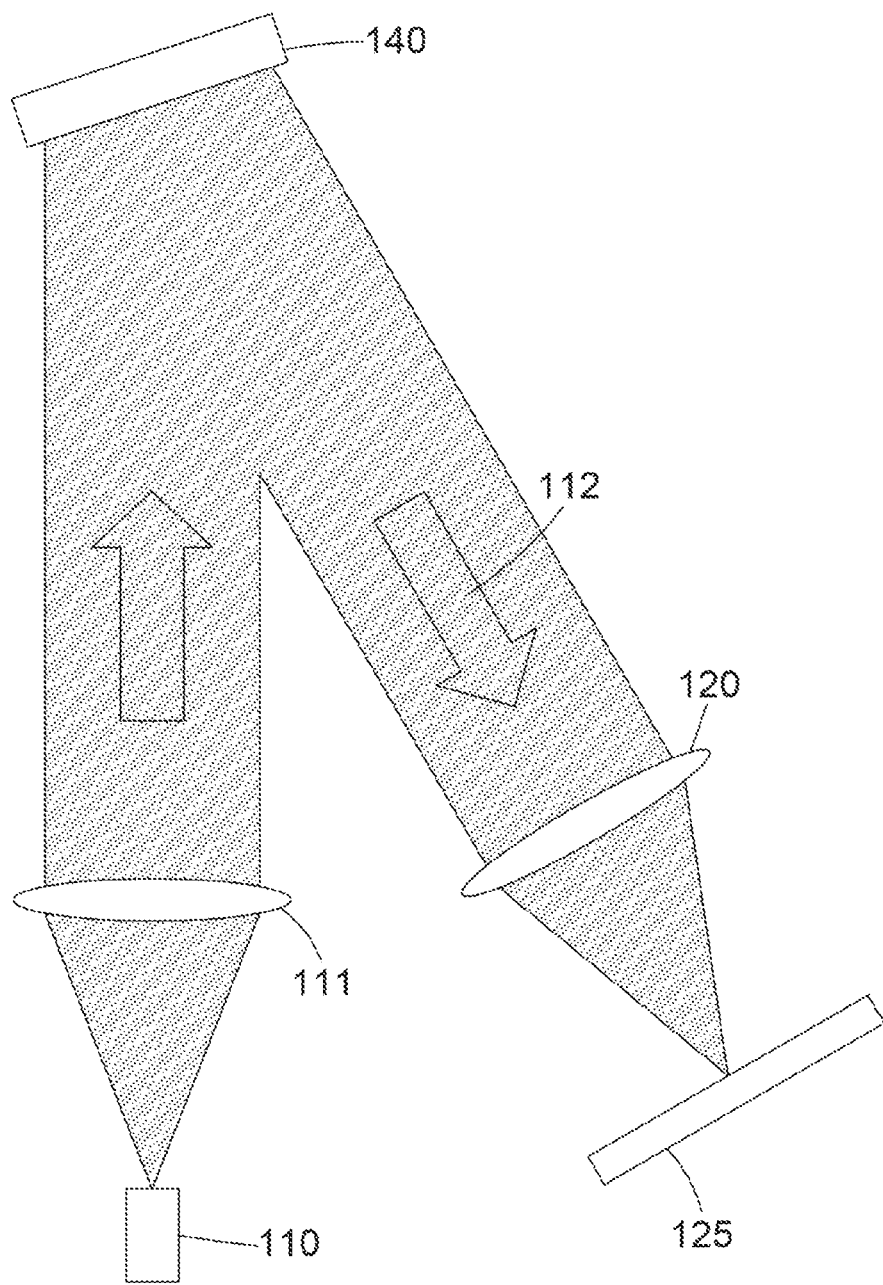
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods. United Kingdom application No. GB 2112213.0 filed 26 Aug. 2021, incorporated herein by reference, discloses example hologram calculation methods that may be combined with the present disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Light Modulation

The display system comprises a display device defining the exit pupil of the display system. The display device is a spatial light modulator. The spatial light modulation may be a phase modulator. The display device may be a liquid crystal on silicon, "LCOS", spatial light modulator.

Light Channelling

The optical system disclosed herein is applicable to pupil expansion with any diffracted light field. In some embodiments, the diffracted light field is a holographic light field—that is, a complex light field that has been spatially modulated in accordance with a hologram of an image, not the image itself. In some embodiments, the hologram is a special type of hologram that angularly divides/channels the image content. This type of hologram is described further herein merely as an example of a diffracted light field that is compatible with the present disclosure. Other types of hologram may be used in conjunction with the display systems and light engines disclosed herein.

A display system and method are described herebelow, which comprise a waveguide pupil expander. As will be familiar to the skilled reader, the waveguide may be configured as a 'pupil expander' because it can be used to increase the area over (or, within) which the light emitted by a relatively small light emitter—such as a relatively small SLM or other pixelated display device as used in the arrangements described herein—can be viewed by a human viewer or other viewing system that is located at a distance, such as a relatively large distance, away from the light emitter. The waveguide achieves this by increasing the number of transmission points from which the light is output, towards the viewer. As a result, the light may be seen from a plurality of different viewer locations and, for example, the viewer may be able to move their head, and therefore their line of sight, whilst still being able to see the light from the light emitter. Thus, it can be said that the viewer's 'eye-box' or 'eye-motion box' is enlarged, through use of a waveguide pupil expander. This has many useful applications, for example but not limited to head-up displays, for example but not limited to automotive head-up displays.

A display system as described herein may be configured to guide light, such as a diffracted light field, through a waveguide pupil expander in order to provide pupil expansion in at least one dimension, for example in two dimensions. The diffracted light field may comprise light output by a spatial light modulator (SLM), such as an LCOS SLM. For example, that diffracted light field may comprise light that is encoded by a hologram displayed by the SLM. For example, that diffracted light field may comprise light of a holographically reconstructed image, corresponding to a hologram displayed by the SL M. The hologram may comprise a computer-generated hologram (CGH) such as, but not limited to, a point-cloud hologram, a Fresnel hologram, or a Fourier hologram. The hologram may be referred to as being a 'diffractive structure' or a 'modulation pattern'. The SLM or other display device may be arranged to display a diffractive pattern (or, modulation pattern) that comprises the hologram and one or more other elements such as a software lens or diffraction grating, in a manner that will be familiar to the skilled reader.

The hologram may be calculated to provide channeling of the diffracted light field. This is described in detail in each of GB2101666.2, GB2101667.0, and GB2112213.0, all of which are incorporated by reference herein. In general terms, the hologram may be calculated to correspond to an image that is to be holographically reconstructed. That image, to which the hologram corresponds, may be referred to as an 'input image' or a 'target image'. The hologram may be calculated so that, when it is displayed on an SLM and suitably illuminated, it forms a light field (output by the SLM) that comprises a cone of spatially modulated light. In some embodiments the cone comprises a plurality of continuous light channels of spatially modulated light that correspond with respective continuous regions of the image. However, the present disclosure is not limited to a hologram of this type.

Although we refer to a 'hologram' or to a 'computer-generated hologram (CGH)' herein, it will be appreciated that an SLM may be configured to dynamically display a plurality of different holograms in succession or according to a sequence. The systems and methods described herein are applicable to the dynamic display of a plurality of different holograms.

Figure 2:
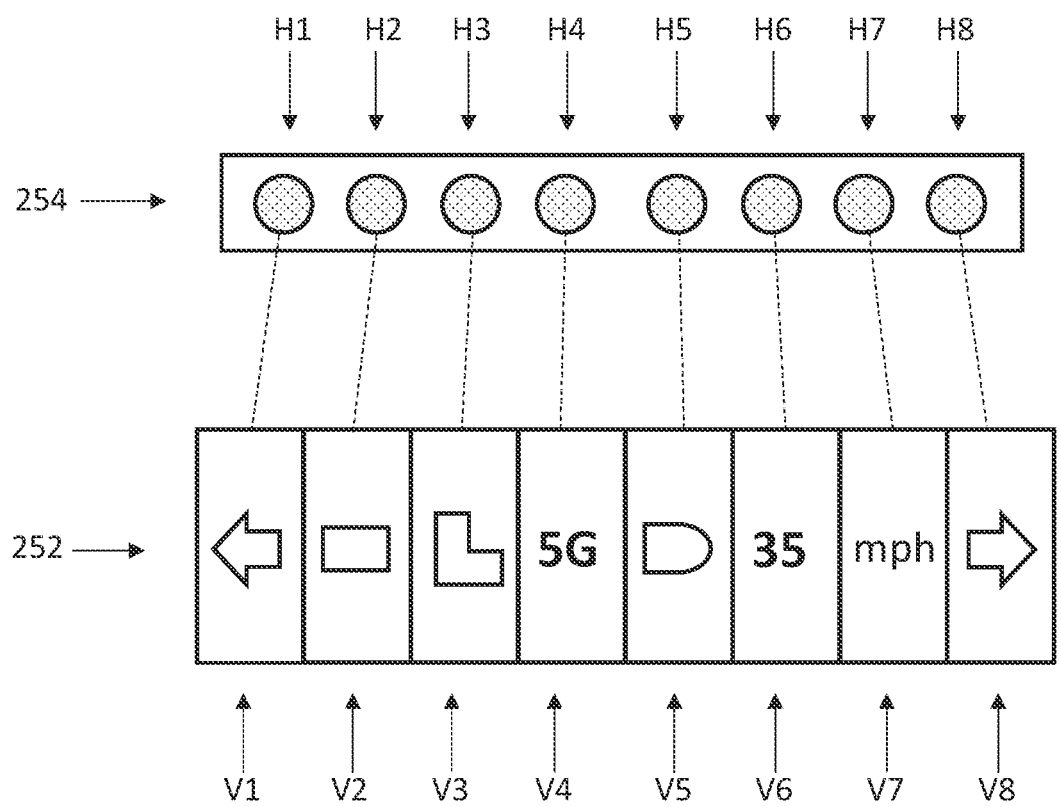
FIG. 2 shows an image for projection comprising eight image areas/components, V1 to V8.
Figure 3:
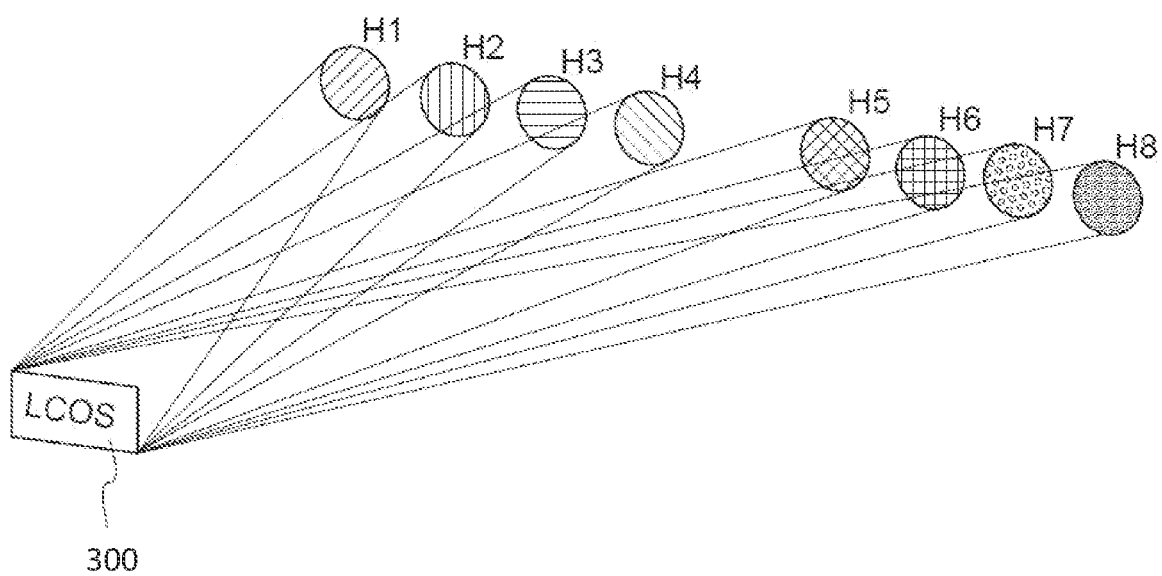
FIG. 3 shows a hologram displayed on an LCOS 300 that directs light into a plurality of discrete areas.

FIGS. 2 and 3 show an example of a type of hologram that may be displayed on a display device such as an SLM, which can be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channeling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of the entrance pupil of the viewing system.

Figure 4:
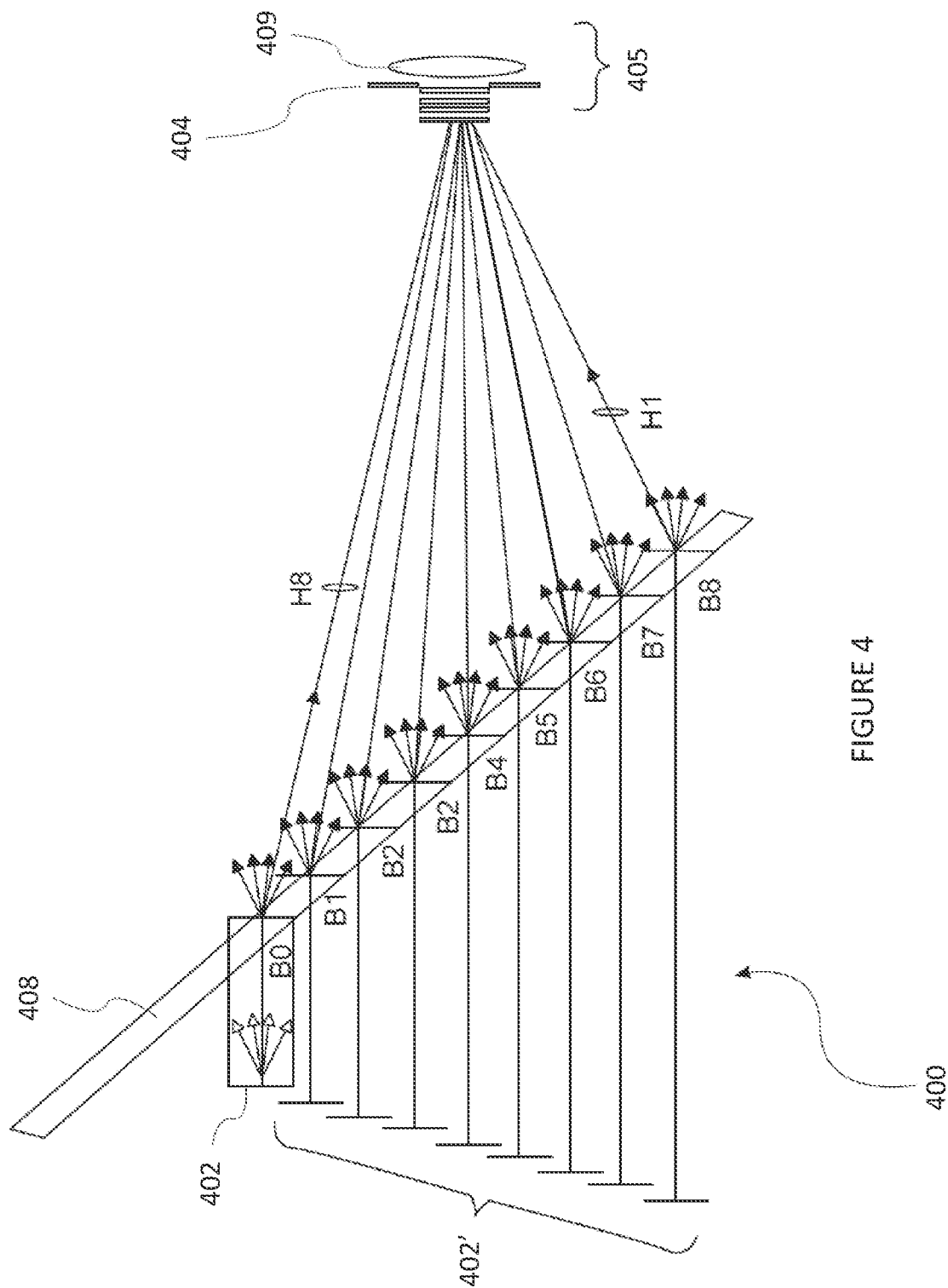
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 408 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The waveguide 408 forms a plurality of replicas of the hologram, at the respective "bounce" points B1 to B8 along its length, corresponding to the direction of pupil expansion. As shown in FIG. 4, the plurality of replicas may be extrapolated back, in a straight line, to a corresponding plurality of replica or virtual display devices 402'. This process corresponds to the step of "unfolding" an optical path within the waveguide, so that a light ray of a replica is extrapolated back to a "virtual surface" without internal reflection within the waveguide. Thus, the light of the expanded exit pupil may be considered to originate from a virtual surface (also called an "extended modulator" herein) comprising the display device 402 and the replica display devices 402'.

The methods and arrangements described above can be implemented in a variety of different applications and viewing systems. For example, they may be implemented in a head-up-display (HUD) or in a head or helmet mounted device (HMD) such as an Augmented Reality (AR) HMD.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5:
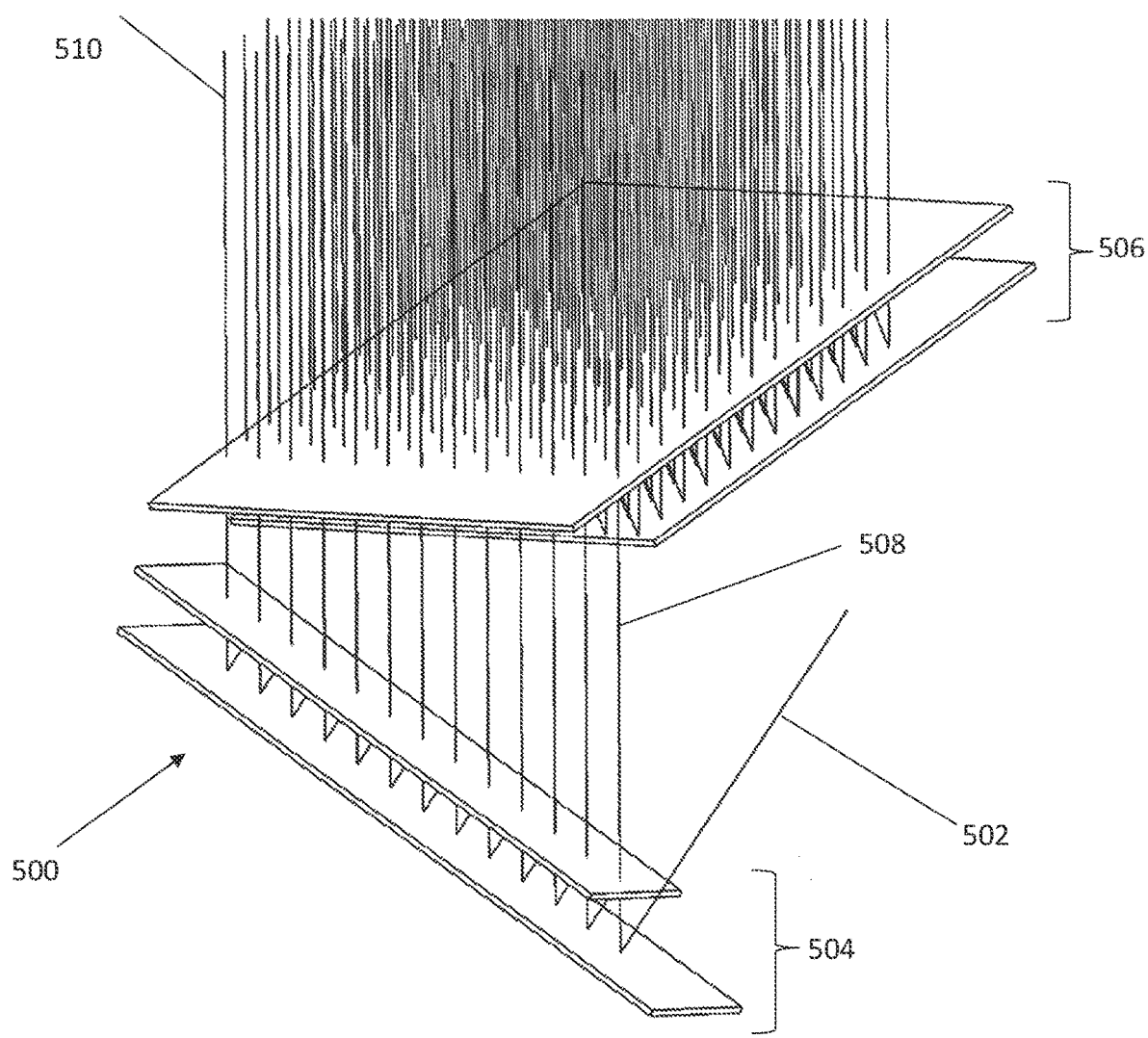
FIG. 5 shows a perspective view of a system comprising two replicators arranged for expanding a light beam in two dimensions.

FIG. 5 shows a perspective view of a system 500 comprising two replicators, 504, 506 arranged for expanding a light beam 502 in two dimensions.

In the system 500 of FIG. 5, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5 combine to provide a two-dimensional replicator (or, "two-dimensional pupil expander").

Angled Switching Device

FIGS. 6A and 6B illustrate a hologram/pupil replication system in accordance with some embodiments. The pupil replication system comprises a first replicator 604, a second replicator 606 (not shown in FIG. 6A), a triangular wedge 612, and a turn mirror 614. Diffracted input light 602 is coupled into the first replicator 604 at an acute angle of incidence in order to cause light to propagate along the first replicator 604 and therefore allow for pupil expansion. The first replicator 604 and the second replicator 606 are waveguides, each waveguide configured to expand light in a single dimension. The first replicator 604 and the second replicator 606 act together to expand or replicate the exit pupil of the display in a horizontal and vertical dimension, such that the eye box or viewing area is increased.

Turn mirror 614 directs light towards the second replicator 606 (not shown in FIG. 6A). The triangular wedge 612 is located in an optical path between the turn mirror 614 and the first replicator 602. The triangular wedge 612 imparts a change in angle of the rays exiting the first replicator 612 in order to enable stacking of the replicated pupils in the second replicator 606. The triangular wedge 612 is a prism comprising at least two optical surfaces. An optical surface is a surface is a surface of the prism that is intended to receive or transmit light.

FIG. 6B illustrates a side view of the pupil replication system as described in relation to FIG. 6A. An aperture device 616 is shown located in front of the input region of the second replicator 606. The aperture device 616 may be used to prevent cross-talk between channels, as described in GB2108456.1 filed on 14 Jun. 2021, the contents of which are herein incorporated by reference. The aperture device 616 may also be referred to as a switching device or control device.

The aperture device 616, or control device may be formed from any suitable material. For example, it may comprise a liquid crystal device or a plurality, such as an array, of liquid crystal devices that can each switch between being opaque and transmissive. For example, the control device may comprise a "smart glass" or "switchable glass" whose light transmission properties can be altered when voltage, light, or heat is applied. The control device may be controlled by any suitable processor or controller. Its configuration may be changed rapidly, in order to coordinate, or synchronise, with the dynamic display of multiple different holograms on a display device, for example in order to reconstruct different respective target images and/or to accommodate the movement of a viewer or viewing system.

The aperture device 616 or control device disclosed herein may take any number of different forms. In some embodiments, the control device comprises a plurality, such as a 2D array, of individually controllable light receiving/ processing elements such as pixels. In some embodiments, the control device comprises a pixelated liquid crystal device or display. In some embodiments, the elements or pixels are operable in contiguous groups to form transmissive and non-transmissive shutter zones. Each group of pixels may be switchable between a first mode e.g. transmissive and a second mode e.g. reflective. The person skilled in the art is familiar with how a pixelated display device may be controlled in order that the size and position of groups or zones of pixels—each zone having a different response to light—may be changed in operation such as in real-time. Each zone is larger than the pixel size of the device. Each zone may therefore comprise a plurality of pixels. The person skilled in the art is equally familiar with how optical components such as polarisers and waveplates may be implemented in conjunction with a pixelated liquid crystal device to provide a reconfigurable light shutter. By way of example only, the control device may utilize polarization selection but other schemes based on other characterizing properties of light are equally applicable. In some embodiments, the control device comprises a pixelated liquid crystal display and, optionally, other optical elements collectively configured to transmit light having a first polarization and absorb or reflect light having a second polarization, optionally, wherein the first polarization and second polarization are opposite or complementary. For the avoidance of doubt, any number of different optical systems may be used to form the control device depending on the characteristics, such as polarization and wavelength, of the light forming the image and the present disclosure is not therefore limited by the construction of the control device. It will therefore be understood that the control device disclosed herein is defined by its functionality rather than its structure.

The aperture device 616 or control device is dynamically reconfigurable. In some embodiments, the control device is pixelated. That is, the control device comprises an array of individually controllable pixels. Each pixel may comprise, for example, liquid crystal configurable between a transmissive state and non-transmissive state.

As can be seen in FIGS. 6A and 6B and in general, propagation refers to a general or group direction of light propagation in the waveguide. The direction of propagation may also be referred to as the optical axis (or plane) of the waveguide.

Figure 7A:
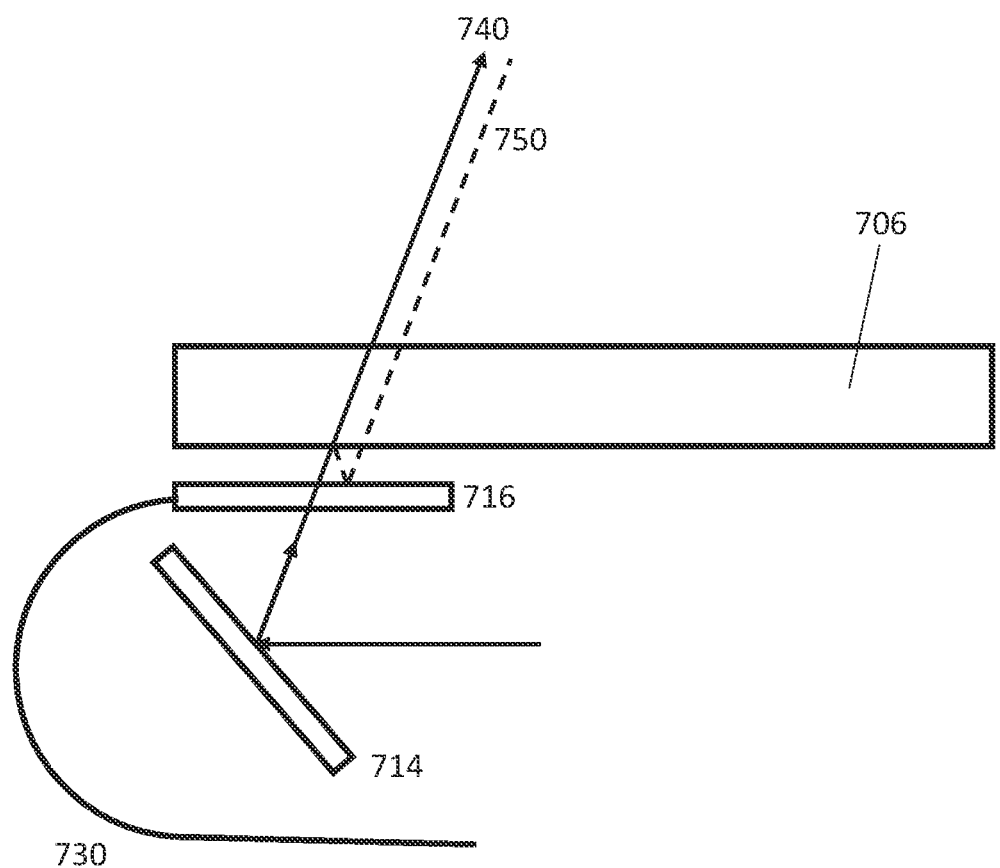
FIG. 7A shows an expanded view of a system comprising a second replicator, a switching device and a fold mirror.

FIG. 7A shows an enlarged view of the pupil replication system, showing only the second replicator 706, the switching device 716, and a turn mirror 714. For ease of viewing, other components such as the first replicator are not shown in FIG. 7A. The switching device 716 also comprises a cable 730, the cable 730 to power and enable control signals to be sent to switch each cell of the switching device 716. Light is incident on the turn mirror 714 and reflects towards the second replicator 706. The switching device 716 is located in an optical path between the turn mirror 714 and the second replicator 706. Light interacts with the switching device and is either directed to be coupled into the second replicator 706 or directed such that it remains uncoupled. Light that is coupled into the second replicator exits in a first path 740. However, it is unlikely that 100% of light is coupled into the second replicator 706, even in a very efficient system. A portion of the light incident on the input region of the second replicator 706 will be reflected by the input region and re-interact with the switching device 716, such that it is reflected back towards the input region of the second replicator 706. This reflected light will be coupled into the second replicator and exit in a second path 750. The presence of the second path causes ghost images, which deteriorate the image the users see, potentially obscuring important symbology, which increases the danger to the user and reduces the safety of the system.

Figure 7B:
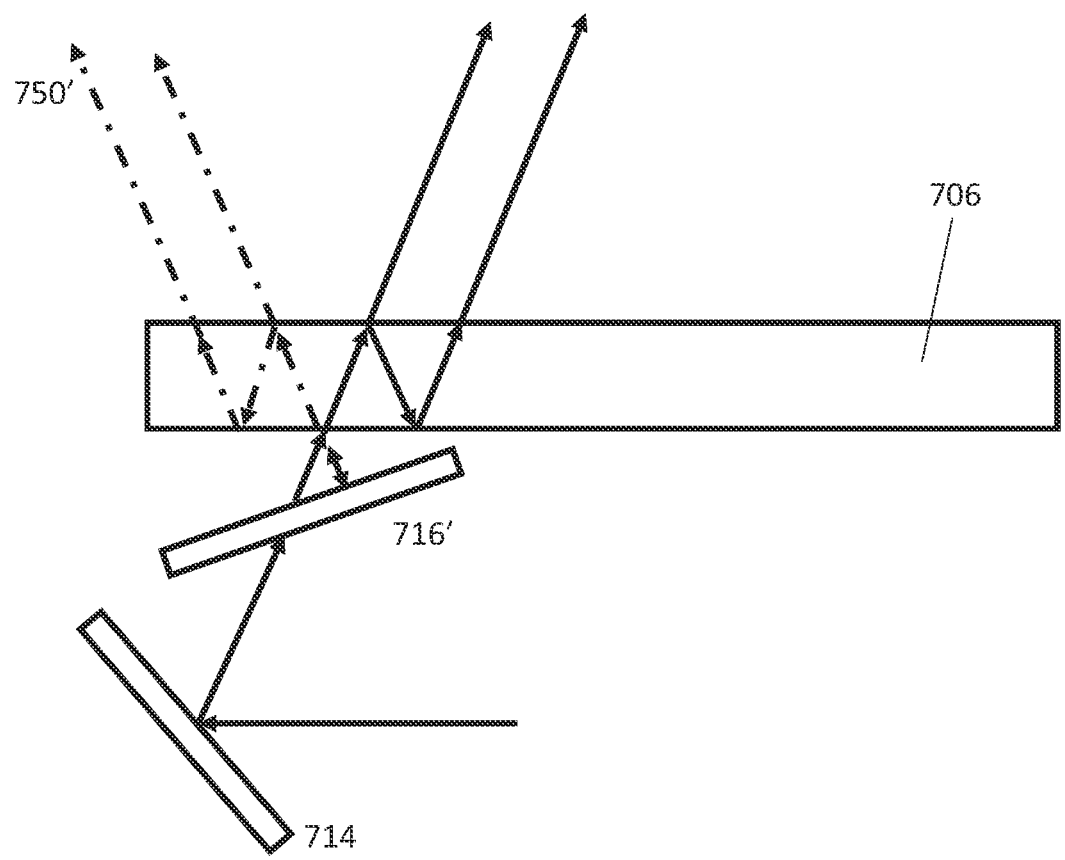
FIG. 7B shows an expanded view of a system comprising a second replicator, an angled switching device and a fold mirror.

FIG. 7B illustrates a system that addresses the problems described with reference to FIG. 7A. The system comprises a second replicator 706, a switching device 716'. The switching device is located in an optical path between the turn mirror 714 and the second replicator. The switching device 716' is angled such that it forms an acute angle relative to the second replicator 706. The switching device 716' then relays light towards the input region of the second replicator 706 (when in the appropriate switching state). Due to the positioning and angle/tilt of the switching device 716', light that is reflected by the second replicator 706 is either reflected such that, if it is coupled into the second replicator 706, it is output in a spatially separate path 750'. Light in separate path 750' is not directed towards the viewing area of the display device. This may reduce the presence of any ghost images.

In some embodiments the switching device 716' may comprise a transmissive system, where each cell comprises a switchable element switchable between a substantially opaque state and a substantially transmissive state. The switching device may comprise an LCD.

However, since stray light is still coupled into the replicator 706, there may still be the possibility that some stray light is output towards the use's eye.

Figure 8:
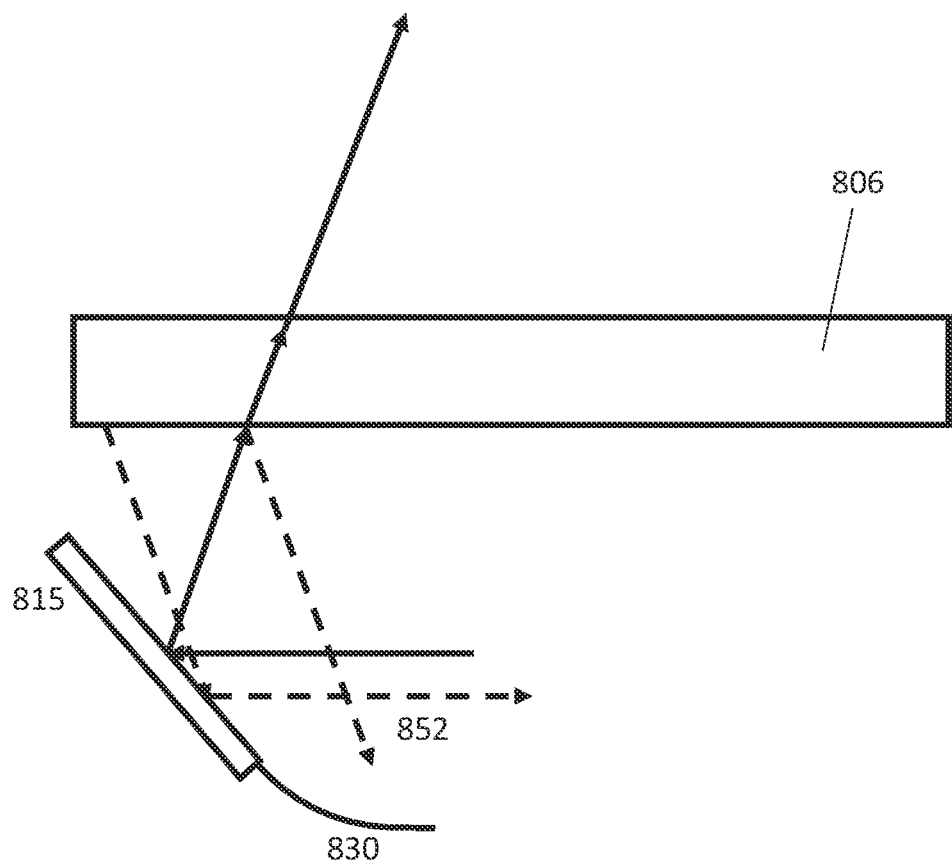
FIG. 8 shows an expanded view of a system comprising a second replicator and an angled switching device.

FIG. 8 illustrates a system that may further reduce the presence of ghost images. The system of FIG. 8 comprises a second replicator 806 (first replicator is not shown). A switching device 815 is located in an optical path between the first replicator and the second replicator 806. The switching device also comprises a cable 830, the cable 830 to power and enable control of the switching device 815. The switching device 815 is angled such that it forms an acute angle relative to the second replicator 806. Light is then relayed (when the cell of the switching device 815 is in the appropriate switching state) to be coupled into the second replicator 806. Due to the position and angle of the switching device 815, light that is reflected and not coupled by the second replicator 806 is either not relayed towards the switching device 815, or is relayed such that subsequent reflections are not incident on the second replicator 806, but relayed away from the second replicator in a second path 852.

The embodiment as described with relation to FIG. 8 reduces the chance of ghost images, and therefore increases the safety of the system as symbology may be displayed more clearly. This may be particularly useful when the display system is used as a part of a display in a vehicle, such as a HUD in an automotive vehicle. Furthermore, the embodiment as described also improves the packaging of the display system, as the cables 830 may be located in a more advantageous position than comparison to the system as described with respect to FIG. 7A.

In some embodiments the switching device 815 may comprise a reflective system, such as a microelectromechanical systems (MEMS), where each cell comprises a switchable mirror. In some embodiments the reflective system may comprise an LCD system.

In some embodiments, the diffracted light field comprises diverging ray bundles. In some embodiments, the image formed by the diffracted light field is a virtual image.

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In aspects, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander or replicator may be coupled to an input port of a second waveguide pupil expander. The second waveguide pupil expander or replicator may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander or replicator may be arranged to provide pupil expansion, or replication, in a first direction and the second waveguide pupil expander or replicator may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension may correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A light engine arranged to form an image visible from a viewing window, wherein the light engine comprises:
    a display device arranged to display a hologram of the image and spatially modulate light in accordance with the hologram, wherein the hologram is configured to angularly distribute spatially modulated light of the image in accordance with position of image content, such that angular channels of the spatially modulated light correspond with respective continuous regions of the image;
    a hologram replicator arranged to receive the spatially modulated light and provide a plurality of different light propagation paths for the spatially modulated light from the display device to the viewing window, the hologram replicator comprising a first replicator and a second replicator; and
    a control device disposed in an optical path between the first replicator and the second replicator, wherein the control device comprises an array of cells arranged such that a first viewing position within the viewing window receives a first channel of light spatially modulated by the hologram in accordance with a first region of the image and a second viewing position within the viewing window receives a second channel of light spatially modulated by the hologram in accordance with a second region of the image,
    wherein the control device is angled at an acute angle relative to the second replicator and each cell of the array is switchable between a first state and a second state, wherein in each cell in the first state light is relayed to be coupled into the second replicator and in each cell in the second state light remains uncoupled into the second replicator;
    wherein the first replicator is configured to replicate the light in a first dimension and the second replicator is configured to replicate the light in a second dimension, orthogonal to the first dimension.

2. The light engine according to claim 1, wherein the control device is a reflective device, such that in the first state light is reflected towards the second replicator.

3. The light engine according to claim 2, wherein the reflective device comprises a microelectromechanical system (MEMS) device.

4. The light engine according to claim 1, wherein each cell comprises a mirror that pivots such that in the first state light is reflected towards the second replicator and coupled into the second replicator and in the second state light is reflected such that it remains uncoupled in the second replicator.

5. The light engine according to claim 1, wherein the control device comprises a liquid crystal device such that each cell in first state is substantially reflective or transmissive, and each cell in the second state is substantially absorptive.

6. The light engine according to claim 1, wherein the control device receives light directly from the first replicator.

7. The light engine according to claim 6, wherein the control device acts as a fold mirror.

8. The light engine according to claim 1, wherein each cell in the second state directs light towards a light dump or a non-coupling region of the second replicator.

9. The light engine according to claim 1, wherein in each cell in the second state light is relayed towards a sensor for monitoring integrity of the light engine.

10. The light engine according to claim 1, wherein the array of cells is a 1D array.

11. The light engine according to claim 1, wherein the switching is based on output of an eye tracker.

* * * * *